United States Patent Office 3,163,611
Patented Dec. 29, 1964

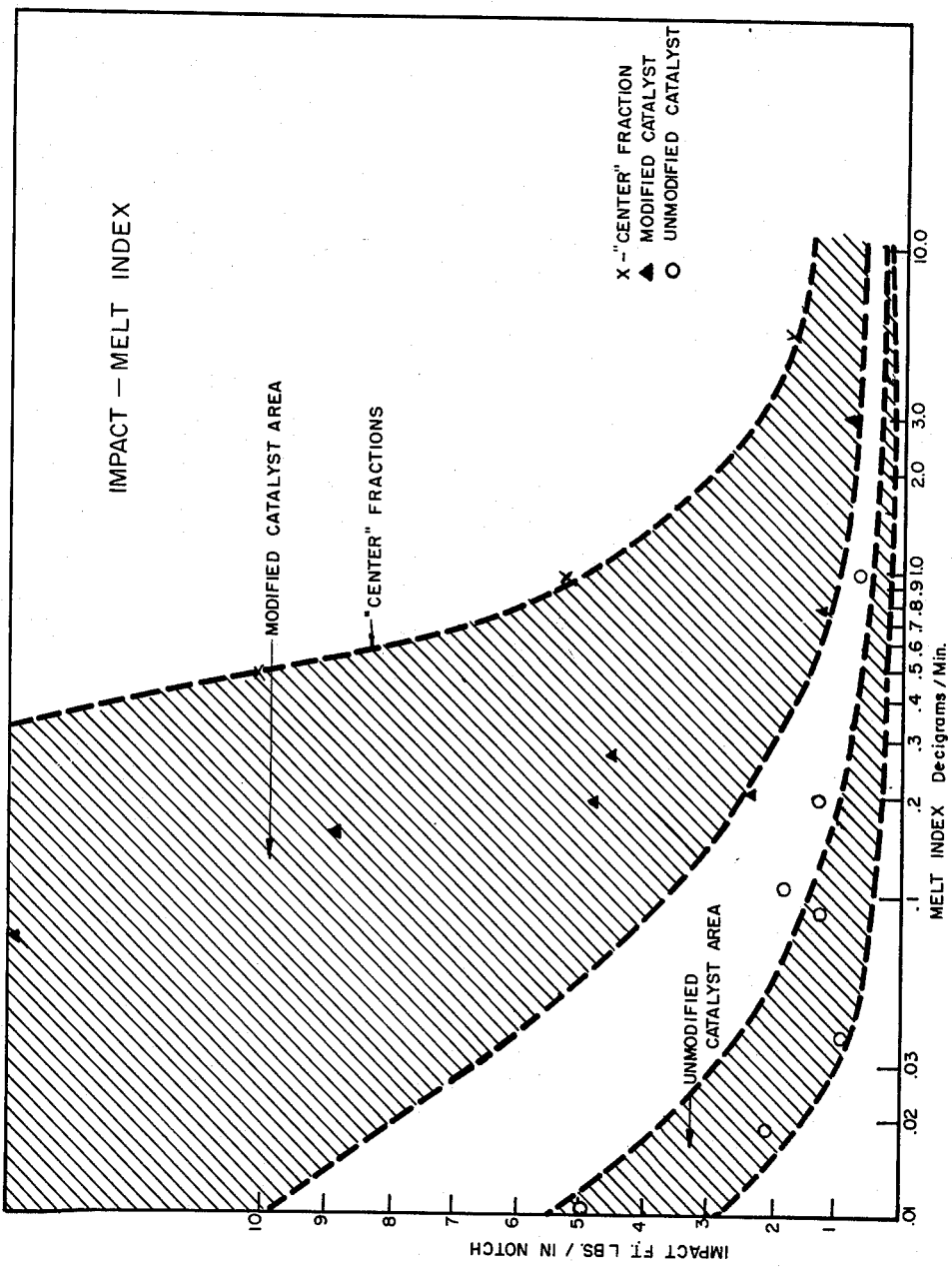

3,163,611
METHOD OF PREPARING A MODIFIED ZIEGLER POLYMERIZATION CATALYST
Harry M. Andersen and William R. Richard, Jr., Dayton, Ohio, assignors to Monsanto Company, a corporation of Delaware
Filed Nov. 7, 1957, Ser. No. 695,153
1 Claim. (Cl. 252—429)

This invention relates to Ziegler catalysts, to the preparation of Ziegler catalysts, and to the use of Ziegler catalysts to effect chemical reactions, especially polymerizations. In certain preferred aspects, the invention pertains to the production of high-density polyethylene by polymerizing ethylene in the presence of a catalyst exemplified by the material obtained by the interaction of a trialkyl aluminum with titanium tetrachloride, said catalyst having been especially treated to result in the production of polyethylene of improved properties over that obtainable with the same catalyst not so treated.

Summary of Invention

The essence of the present invention lies in the use of a reactive organic oxygen compound to modify the characteristics of Ziegler catalysts, whereby the use of such modified catalysts permits the production of improved Ziegler polymers. In a fundamental aspect, the invention involves the use of a reactive organic oxygen compound—modified Ziegler catalyst to narrow the molecular weight distribution pattern of Ziegler polymers, with consequent improvement in many properties. The contemplated reactive organic oxygen compounds will, in general, be compounds containing active oxygen-containing functional groups, such as, for example, alcohols, ketones, aldehydes and organic acids. One polymerization of especial interest is the production of polyethylene of high density and improved impact/flow properties made possible by the practice of the invention. Of further interest is the production of polyethylene film of high optical clarity made possible by the practice of the present invention.

Significance of Polymer Density

In any polymer showing the presence of a crystalline phase by X-ray diffraction, the density is a direct function of the crystallinity, the greater the crystallinity the higher the density. High-molecular-weight polymers of ethylene, called polyethylene, are important materials of commerce, and they are partially crystalline semi-rigid polymers having great utility. By the use of certain types of catalysts advanced by Professor-Dr. Karl Ziegler, polyethylene can be made at low pressures and such polyethylene has considerably higher density—generally about 0.940 to 0.948 g. per cc., the density depending somewhat upon reaction conditions and especially on solvent, e.g., in kerosene the usual density is within the range of 0.942 to 0.947 and with heptane the usual density is about 0.948—than polyethylene as usually made by the earlier high-pressure oxygen- or peroxide-catalyzed polymerization methods. These higher density polyethylenes, as a result of their greater crystallinity, are much more rigid than the high-pressure polyethylenes, and have considerably higher softening and melting points. These properties make possible the improvements in the heretofore known uses of polyethylene, and indicate the likelihood that the high-density polyethylenes may replace certain other thermoplastic polymers in various uses. It thus becomes clear that still further increase in crystallinity of polyethylene, which is reflected in increased density, would result in still further improvements in certain properties such as stiffness and resistance to heat. Also, increased crystallinity in polyethylene is reflected in an increased tensile yield strength which, of course, is quite desirable.

Significance of Flow/Impact Properties

Although Ziegler polymers have many valuable properties, Ziegler polymers, particularly Ziegler polyethylenes, have in the past been characterized by a poor relationship of impact and flow properties. The significance of these properties and the importance of their relationship is readily apparent. The impact strength is a measure of the resistance of the material to breaking; it is obvious that high impact strength is desirable for many uses. The melt flow properties of the material indicate the ease with which the material can be induced to flow under pressure; the melt flow properties determine the ease with which the polymer can be processed by such procedures as extrusion, film blowing, etc., the more readily flowing polymers (having higher melt indices) being more readily processed in general. The present commercial Ziegler polyethylene polymers are defective in either impact strength, flow properties, or both, for many applications. Moreover, if the polymerization is adjusted by conventional means to raise the molecular weight thereby improving the impact strength, the flow properties will be adversely affected and the polymer may be completely intractable under ordinary processing conditions. Conversely, if the polymerization conditions are altered in known manner to produce a lower-molecular-weight polymer, the impact strength will be adversely affected and it will be impossible to employ the polymer in applications requiring high impact strength.

It will be realized that the impact/flow properties are related to the density of the polymer. For impact properties are ordinarily expected to deteriorate with increasing density, if a constant melt index is maintained. Thus, it is difficult to obtain the benefits of high-density polymers along with good impact/flow properties. However, the polymers disclosed herein have good impact/flow properties at high densities, e.g., at densities as high as 0.96 or 0.97 or higher.

The present invention makes it possible to prepare polyethylenes and other polymers having both high impact strength and good flow properties. It is not possible to set any absolute limit on the desirable impact strengths and flow properties, as the requirements in this regard will depend on the application. However, it can, in general, be stated that in the ranges of interest for practical purposes the higher the impact strength and melt index, the better. With reference to the accompanying figure, it will be desirable that the melt indices and impact strength of the polyethylenes be substantially to the right of or above the unmodified catalyst area, i.e., the area of ordinary Ziegler polyethylene. In the figure, which illustrates impact strengths and melt indices for low pressure, high-density polyethylenes, values for the impact strength are shown on the ordinate, and values for melt index are shown on a logarithmic scale on the abscissa. The use of the reactive oxygen compound modifiers and modified catalysts as disclosed in the present invention makes it possible to obtain polyethylene having a density comparable to or higher than ordinary Ziegler polyethylene, and with improved impact-flow values, for example, with values in the area of the figure designated as the modified catalyst area. The modified catalyst produces polyethylenes comparable in properties to the "center" fractions obtained by fractionation of ordinary Ziegler polyethylene and represented by the "center" fractions curve in the figure.

Ordinarily, the high-quality polyethylenes as prepared by the methods taught herein will have impact-flow properties at least as desirable as those contemplated by variation of the impact strength from 1 to 12 ft.-lbs. as the melt index varies from 10 to 0.02 decigrams per minute. A melt-index range which is often practicably obtainable and useful with regard to Ziegler polyethylenes in general is about 0.4 to 2 or 3 decigrams per minute or higher, and in this range the alcohol modifiers of the present invention make it possible to easily obtain strengths of 1 to 2 ft.-lbs., and often produce impact strengths of 5 to 10 ft.-lbs. or more. It will be realized that the inclusion of the foregoing numerical and graphical data is not intended to limit the scope of the present invention or the scope of the application of the contemplated modified Ziegler catalyst, but rather is intended to illustrate some of the characteristic improvements in flow/impact properties which can be obtained by using the modified catalysts of the present invention.

It is believed, as will be discussed more fully below, that the improvement in flow/impact properties resulting from the use of the modified polymerization catalysts of the present invention is due to narrower molecular weight distributions in the polymers.

Various other polymers, especially those of unsaturated hydrocarbons such as propylene, butenes, styrene, and the like, can be prepared in crystalline form. It has been said that crystallinity of such polymers can result from an "isotactic" structure of the molecule, which word is used to indicate a regular arrangement of side groups along the carbon chain for at least considerable portions of the molecule. Many of the crystalline polymers of these unsaturated hydrocarbon monomers are obtained by fractionation of total polymer such as by use of one or more solvents which dissolve the amorphous or lesser crystalline portion of the polymer; thus the heptane-insoluble polypropylene and polystyrene are more crystalline than those fractions soluble in heptane. In these polymers other than polyethylene, though crystallinity may primarily result from a regular arrangement of side groups on the chain, it also, no doubt, is somewhat dependent on the extent of branching of the chains, just as in polyethylene. Thus, increased linearity of polymer chain, whether it be polyethylene, polypropylene, polystyrene or the like, as reflected by a lessening of the branching of the chain, results in a higher degree of crystallinity with resulting improved properties as mentioned heretofore.

It can also be appreciated that the flow/impact properties of these other polymers, e.g., those of unsaturated hydrocarbons such as propylene, butenes, styrene, and the like, and copolymers of the foregoing with each other or with ethylene will benefit from a narrower molecular weight distribution resulting from use of the modified catalysts of the present invention.

While the present invention is of especial interest at the present time with respect to polyethylene in which crystallinity is almost solely a reflection of the degree and type of branching, it is also applicable to all Ziegler-type polymerizations, special reference being made to the preparation of polypropylene, polybutene, 4-methylpentene-1, and polystyrene which are currently of the most potential interest from a commercial viewpoint.

Ziegler-Type Catalysts

There has recently come into commercial prominence the polymerization of ethylene and other monomers through the agency of a type of catalyst advanced by Prof.-Dr. Karl Ziegler of the Max Planck Institute at Mulheim, Ruhr, Germany. Probably, the preferred group of these catalysts is that disclosed in Belgian Patent No. 533,362 issued May 16, 1955, to Ziegler, the disclosure of which is hereby incorporated herein by reference, namely catalysts prepared by the interaction of a trialkylaluminum with a compound of a metal of Group IV-B, V-B, or VI-B of the Periodic System, including thorium and uranium, and especially compounds of titanium, zirconium, and chromium. These and the variety of other catalysts of the Ziegler type, can be considered exemplified by the catalysts obtained by the interaction of a trialkylaluminum with titanium tetrachloride. Other catalysts of the Ziegler type differ from those disclosed in the above-mentioned Belgian Patent No. 533,362, in various ways, for example, as follows. Instead of or in addition to the aluminum trialkyls, catalysts of the type described in the Belgian patent can be made by reacting the various metal compounds of Groups IV-B, V-B, and VI-B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Another Ziegler-type catalyst is prepared by the interaction of an aluminum compound of the general formula $R_2AlX$ where R is a hydrocarbon radical such as alkyl or aryl, and X is a halogen, such as chlorine or bromine, with a compound of a metal of Group VIII of the Periodic System, e.g., iron, nickel, cobalt, or platinum, or manganese, for example, dimethylaluminum monobromide plus ferric chloride, diisobutylaluminum chloride plus nickel (trivalent) chloride, diethylaluminum monochloride plus manganic chloride. Yet another combination is that of the Group IV-B, V-B, or VI-B metal compounds with aluminum compounds of the general formula $R_2AlX$, where R is hydrogen or a hydrocarbon radical, and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. The Ziegler catalyst is adapted for the low-pressure polymerization of ethylene so that when suspended in a concentration of about 20 m. moles/liter (based on polyvalent metal) in a well-agitated inert solvent, it will cause an ethylene uptake rate of at least 5 grams per hour per liter of solvent.

It is generally considered that the Ziegler catalysts are obtained by interaction of a polyvalent metal compound with another metal in elemental or combined form resulting in reduction of the valence state of the first said metal. The resulting polymetal Ziegler catalyst is believed to act as a heterogeneous catalyst, i.e., at least some of the product obtained by the interaction of the materials in question is present in solid form although often in such finely divided form as to be of colloidal or subcolloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid.

The essence of the present invention, however, is not to be found in the particular Ziegler-type catalyst employed but rather in the use of a reactive organic oxygen compound in the preparation of such catalyst, with consequent advantages when used to catalyze a variety of chemical reactions, polymerization of ethylenically unsaturated monomers being of particular interest.

Ziegler Reactions and Polymers

Ziegler catalysts can be employed to catalyze a variety of chemical reactions, for example the chlorination of benzene to produce mono- and polychlorobenzenes, especially ortho- and paradichlorobenzene. The reaction of most intense commercial interest at the present time is polymerization. The present invention is broadly applicable to all Ziegler catalysts, and their use in all chemical reactions catalyzed thereby, and insofar as polymerization is concerned, is broadly applicable to all Ziegler-type polymers, i.e., all polymers prepared by polymerizing a monomer or mixture of monomers in the presence of a Ziegler-type catalyst. A monomer which can be so polymerized can properly be called a Ziegler-polymerizable monomer. Of especial interest, of course, are those Ziegler solid polymers of sufficiently high molecular weight to be useful in the plastics industry, but benefits of the invention are obtainable in preparing lower-molecular-weight Ziegler semi-solid and even liquid polymers which can be used, for example, in adhesives, as lube oil additives, etc. The preferred polymers have a molecular weight of at least 2,000 and preferably at least 10,000. Those Ziegler polymers to which the preparation of the present invention is applied with particular advantage generally have much higher molecular weights ranging from 20,000 to 50,000 or 100,000 and even in many cases as high as 1,000,000 to 3,000,000 or more. The molecular weights in question are those calculated in the conventional manner on the basis of the viscosity of the polymer in solution as described in the Journal für Praktische Chemie, 2nd Series, Vol. 158, page 136 (1941) and the Journal of the American Chemical Society, 73, page 1901 (1951).

At the present time, ethylene is the preferred monomer for preparing Ziegler polymers. The ethylene can be homopolymerized, or can be copolymerized with varying amounts, particularly on the order of from 2 to 10 percent, of higher olefins such as propylene, or butylene, especially the former. The ethylene can also be copolymerized with butadiene and/or isoprene as disclosed in the copending application of Carroll A. Hochwalt, Serial No. 502,008, filed April 18, 1955 and now abandoned. Also of interest are the copolymers of butadiene and/or isoprene with styrene, disclosed in the copending application of Carroll A. Hochwalt, Serial No. 501,795, filed April 18, 1955. Homopolymers of butadiene, homopolymers of isoprene, and copolymers of butadiene with isoprene, as prepared by the use of Ziegler-type catalysts are also of great interest, having exceptionally low temperature properties, as disclosed in the copending application of Robert J. Slocombe, Serial No. 502,189, filed April 18, 1955. Other ethylenically unsaturated hydrocarbons whose Ziegler polymers are of potential interest include propylene, butylenes, especially butene-1, amylenes and the like. Substituted olefins are also of interest, such as vinylcyclohexene, styrene, vinylnaphthalene, vinyl aromatic hydrocarbons, generally, etc. Styrene when polymerized in the presence of Ziegler-type catalysts gives a high-molecular-weight polymer showing a crystalline structure by X-ray diffraction examination. Ziegler-type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers can also be prepared by the action of Ziegler catalysts, as disclosed in the copending application of Earl W. Gluesenkamp, Serial No. 507,717, filed May 11, 1955 and now Patent No. 3,026,290. A variety of copolymers of the various monomers named above with each other and with other comonomers can be prepared by Ziegler catalysts, and the present invention in its broadest scope includes all such and, in fact, all polymers prepared through the agency of Ziegler-type catalysts on any single monomer or mixture of monomers polymerizable with such catalysts.

Despite the broad scope of the invention, it will be found more convenient in most of the present application to discuss the invention with specific reference to preferred embodiments thereof, and accordingly, Ziegler-type polyethylene will be especially referred to by way of example. Likewise, referred to especially by way of example will be catalysts prepared by the interaction of a trialkylaluminum with titanium tetrachloride, this being the preferred example of the preferred group of Ziegler catalysts which are those prepared by interaction of ($a$) an aluminum compound of the general formula $R_2AlX$ wherein R is an alkyl, cycloalkyl, or aryl radical and X is hydrogen, halogen, or an alkyl, cycloalkyl, or aryl radical, with ($b$) a metal halide selected from the group consisting of the chlorides, bromides and iodides of titanium and zirconium.

The Invention in Further Detail

In accordance with one embodiment of the present invention, an active Ziegler catalyst is prepared, usually but not always as a dispersion in an inert organic liquid, and there is added to such catalyst a reactive organic oxygen compound in an amount effective to beneficiate, i.e., to beneficially modify the catalyst but insufficient to destroy its activity. An alternative procedure comprises adding the reactive organic oxygen compound to the polyvalent reducible metal compound Ziegler-catalyst-precursor, and interacting the thus-treated precursor with a reducing agent effective to produce an active Ziegler catalyst. (The invention cannot be practiced by adding the reactive organic oxygen compound to the reducing agent rather than to the polyvalent reducible metal compound or the active catalyst.) A suitable amount of a reactive organic oxygen compound will vary somewhat dependent upon the particular oxygen compound, catalyst, and reaction conditions and these amounts will be discussed in detail hereinafter, but in general the amount is in the neighborhood of 0.4 to 1.0 gram-mole of the reactive organic oxygen compound per gram-atom of the multivalent metal in the metal compound that is reduced in preparing the catalyst, e.g., $TiCl_4$. Depending upon the circumstances, the amount may be less than 0.1 gram-mole of the reactive organic oxygen compound per gram-atom of the said metal, or the gram-moles of the reactive organic oxygen compound may be one or two or so times the number of gram-atoms of said metal. Too little of a modifier is not very effective, but on the other hand, not very much can be used or the catalyst will be deactivated, i.e., its catalytic activity will be destroyed. It appears that any amount of a reactive organic oxygen compound decreases the catalytic activity somewhat, but in some instances, this is not undesirable; and in other instances, in accordance with certain aspects of the invention, we readily overcome this effect partially or completely by alteration in reaction conditions, especially by imposing moderate pressure. It also appears that, in general, any amount of reactive organic oxygen compound causes a change in molecular weight of polymer obtained by use of the thus-treated Ziegler catalyst. Here again, in many instances this is not objectionable or is even desirable, while in other instances, in accordance with certain aspects of the invention, we overcome this effect partially or completely by changing the ratio of the reducing component of the catalyst to the multivalent metal component which is reduced.

The amount of a reactive organic oxygen compound to be employed is best related to the amount of catalyst and will vary considerably dependent upon the particular catalyst, its method of preparation, the particular reactive organic oxygen compound, and the extent to which catalyst modificaion is desired. However, the amount of a reactive organic oxygen compound to be used is always small, and an amount will be chosen effective to modify the catalyst but insufficient to decrease its activity to an undesirable extent and certainly insufficient to destroy the catalyst activity completely. A Ziegler catalyst can be considered deactivated for most purposes if it is incapable when suspended in a well-agitated inert solvent in concentration of about 20 m. moles/liter (based on the multivalent metal) of causing an ethylene uptake rate of at least 1 gram per hour per liter of reactor space at 20 atmospheres' pressure; it is not usually practical to use a catalyst which does not have an uptake rate of at least 5–10 grams/hour/liter under such circumstances, and it is preferable that the uptake rate be 100 grams/hour/liter or higher. When the catalyst is employed under pressure and possibly at other concentrations, it should have an uptake rate of at least 25 grams/hour/liter under the conditions of employment, and preferably an uptake rate of 100 grams/hour/liter or higher. The ethylene uptake rates for any conditions can readily be ascertained. Even though a catalyst may be inactive according to the foregoing criteria, it should be realized that it can still have activity in some reactions, and therefore the present invention in its broader aspects contemplates any reactive organic oxygen compound-modified Ziegler catalyst. The Ziegler catalysts are made up of compounds of polyvalent metals which are reduced by reducing agents, the former being exemplified by $TiCl_4$ and the latter being exemplified by trialkylaluminums. For each mole of the said heavy metal compound which is reduced, when the said compound contains one atom of metal per molecule, the amount of a reactive organic oxygen compound to be used will generally be within the range of 0.1 to 2 moles. The optimum range, and even the operable range, in a given situation may be considerably smaller than this stated broad range. In some instances, the range of optimum or operable proportions will be outside these stated ranges. However, it is a matter of the simplest of tests to determine operable and optimum quantities of any given modifier with any given Ziegler catalyst. Such test can, for example, be carried out as described in the specific examples hereinafter, and having had the benefit of the present disclosure, they are well within the skill of the art. With Ziegler catalysts prepared by the interaction of a trialkylaluminum with titanium tetrachloride, there is often used an amount of reactive organic oxygen compound within the range of from 0.1 to 1.5 moles per mole of $TiCl_4$ used, i.e., per gram-atom of titanium. It is often desirable to utilize the reactive organic oxygen compound on approximately a mole per mole basis with the aluminum alkyl, e.g., from about 0.8 to about 1.1 moles for each gram-atom of aluminum.

When Ziegler catalyst prepared in accordance with the present invention is used as a polymerization catalyst, the molecular weight of the resulting polymer is often lower than the molecular weight would be if a modifier had not been used in preparing the catalyst and the polymerization carried out under otherwise identical conditions. In many instances, this is very desirable, as when monomer, catalyst and reaction conditions are chosen to give polymers having desirable properties but whose molecular weights are somewhat higher than desired for a given purpose. However, if it is desired to overcome the effect of the chosen modifier in lowering the molecular weight, this can be done by decreasing the aging time of the catalyst prior to addition of the modifier, or by increasing the aging time subsequent to the modifier addition. The mole ratio of a trialkylaluminum to a titanium salt used in preparing the catalyst also can be used to effect control of molecular weight, the higher ratios producing higher molecular weights. The $R_3Al/TiCl_4$ mole ratios employed are generally in the range of about 0.3:1 to 0.8:1, although a higher or lower ratio can be used, for example, 0.1:1 to 3:1 or so.

Use of a reactive organic oxygen compound tends to decrease the activity of the catalyst. As already pointed out, the amount of reactive organic oxygen compound must be limited so that this decrease in activity does not occur to an extent that is undesirable, all other things being considered, and certainly must be limited so that the catalyst activity is not destroyed. In either case, the activity of the catalyst can be noted by the rate at which ethylene is polymerized or other reaction is effected by the aid of the catalyst in a comparison of said rate with the rate where the modifier is not used and/or the said mole ratio is not increased. Decreased catalyst activity, which results in a decreased rate of reaction, can be compensated for by a change in several reaction variables such as by increasing the amount of catalyst, increasing the temperature, or increasing the pressure. We usually prefer to increase the pressure. We find that a very modest increase in pressure, say from atmospheric up to 50 or 100 or 200 pounds per square-inch gage, is usually quite sufficient to obtain adequate reaction rate. In the case of catalysts which require pressure in the first instance for a satisfactory rate of polymerization when being used to polymerize ethylene or other monomer, the pressure can be still further increased to restore the reaction rate which has decreased because of the use of a reactive organic oxygen compound and/or an increase in the mole ratio of reducing agent to polyvalent metal compounds employed in preparing the catalyst.

We prepare an active Ziegler catalyst, preferably as a dispersion in an inert organic liquid, such as an aliphatic or aromatic hydrocarbon as will be discussed more in detail hereinafter. This dispersion is ordinarily a colloidal suspension of catalyst particles in the liquid. We then add the chosen reactive organic oxygen compound in the chosen amount, and preferably the said compound before addition is diluted somewhat with an inert organic liquid and the addition made with vigorous agitation so as to prevent localized concentration of the said compound during the treatment of the catalyst therewith. It is often convenient in accordance with the invention to prepare an active Ziegler catalyst first, and then to treat same with the chosen reactive oxygen compound. To treat the reducing agent, such as the trialkylaluminum, first with reactive organic oxygen compound and then add the heavy metal compound, e.g., $TiCl_4$, tends to give an almost inactive or completely inactive catalyst and, furthermore, use of such a catalyst if active at all does not result in the improvements in the polymer which are desired. It is often desirable to add the reactive organic oxygen compound first to the multivalent metal compound, e.g., $TiCl_4$, prior to its interaction with the reducing agent, e.g., trialkylaluminum. Ordinarily, the monomer is polymerized in the presence of the modified catalyst dispersion. However, prior to the polymerization or other use of the catalyst, part or all of the solvent may be removed by filtration, evaporation, or the like, care being taken not to use conditions for such a separation that will deactivate the catalyst. It is also possible if a dry catalyst or catalyst in a reduced amount of organic liquid, is to be used, to prepare the active catalyst in such form. In such event, particular care must be taken to insure thorough admixture of the chosen amount of reactive organic oxygen compound with the total catalyst or multivalent metal compound, and this can involve using a limited amount of inert organic liquid as a solvent and/or suspending agent for the chosen reactive organic oxygen compound, or thorough grinding as by ball milling the catalyst or multivalent metal compound, either in a dry condition or with some inert organic liquid present, with the chosen reactive organic oxygen compound.

Ordinarily, it is quite sufficient and, in fact, desirable to use only a single modifier compound. However, it is not outside the scope of the invention to utilize an admixture of two or more reactive organic oxygen compounds or an admixture of any one or more such compounds with any other catalyst modifying agent that may be desired, e.g., with the thiophenols described in copending application, Serial No. 609,798, and now Patent No. 3,009,908.

*Details of Preparation and Use of Ziegler Catalysts*

More detailed information will now be given on preferred procedures and components for preparing various Ziegler catalysts, and it will be understood that the procedures given herein with respect to use of a reactive organic oxygen compound modifier will be followed. Ziegler catalysts, for whatever use desired, can be prepared in the vessel in which the catalyzed reaction is to be carried out, or can be prepared in one vessel and then transferred to the intended reaction vessel, and in either event, can either be used immediately after preparation or after a period of time elapses between the preparation of the catalyst and its subsequent use to catalyze, e.g., polymerization. If the catalyst is to be used after such a period of time, it is apt to lose activity during storage period and/or produce polymer of an increased molecular weight as compared with that produced with fresh catalyst and these disadvantages can be minimized by storing Ziegler catalyst at temperatures below about 10° C. and preferably below −25° C. for fairly long storage periods, as disclosed and claimed in the copending application of Robert J. McManimie, Harry G. Hurst, and Edward H. Mottus, Serial No. 586,352, filed May 22, 1956 and now abandoned. While Ziegler catalysts are often conveniently prepared at room temperature, they can be prepared at higher temperatures, and also certain advantages are obtained, including uniform catalyst activity over the course of a reaction period and more effective removal of catalyst residue if the catalyst is prepared at temperatures below about −25° C. as disclosed and claimed in the copending application of Robert J. McManimie, Harry G. Hurst, and Edward H. Mottus, Serial No. 586,352, filed May 22, 1956 and now abandoned.

We prefer catalysts prepared by the interaction of (a) an aluminum compound of the general formula $R_2AlX$ wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminums, e.g., triethylaluminum, triisobutylaluminum, trioctylaluminum, with titanium tetrachloride.

Suitable aluminum compounds to be reacted with the chlorides, bromides and iodides of titanium or zirconium are those represented by the general formula $R_2AlX$ wherein R is an alkyl, cycloalkyl or aryl radical and X is hydrogen, halogen, or an alkyl, cycloalkyl or aryl radical. By way of example, but not limitation, the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-(β-phenylethyl)aluminum
Diethylaluminum chloride
Diisobutylaluminum chloride
Diisobutylaluminum iodide
Di(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or of zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc., of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mole ratio of aluminum compound to titanium (or zirconium) compound, or stated another and simpler way, the mole ratio of aluminum to titanium (or zirconium) can vary over a wide range, suitable values being from 0.1:1 to 10:1 on up to 15:1 or higher. It is generally preferred to use an Al:Ti mole ratio between 0.3:1 and 5:1. The same ratios apply in the case of the zirconium compounds.

While active catalysts can be prepared by a variety of procedures, the simplest and perhaps most effective is to add the titanium or zirconium halide to the aluminum compound, or vice versa, preferably in the presence of an inert organic solvent. Such solvents can suitably be saturated aliphatic and alicyclic, and aromatic hydrocarbons, halogenated hydrocarbons, and saturated ethers. The hydrocarbon solvents are generally preferred. By way of example can be mentioned liquefied ethane, propane, isobutane, normal butane, n-hexane, the various isomeric hexanes, isooctane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane. In some instances, it is also advantageous to prepare the catalyst in the presence of a monomer; for example, if the catalyst is prepared in the presence of liquid ethylene, and then used to polymerize ethylene, a high yield of polyethylene results.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example, from 5 to 30 parts by weight solvent per 1 part by weight total polymer produced. These inert solvents, which are solvents for the monomers, some of the catalyst components, and some of the polymers, but are non-solvents for many of the polymers, e.g., polyethylene, can also properly be termed inert liquid diluents, or inert organic liquids.

The amount of catalyst required is dependent on the other variables of the particular reaction, such as polymerization, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should be at least about 0.001:1 and much lower values such as 0.0001:1 can sometimes be used.

The polymerization can be effected over a wide range of temperatures, again the particular preferred temperature being chosen in accordance with the monomer, pressure, particular catalyst and other reaction variables. For many monomers from room temperature down to say −40° C. and even lower are suitable, and in many cases it is preferred that the temperature be maintained at below about 35° C. However, for other monomers, particularly ethylene, higher temperatures appear to be optimum, say from 50 to 90° C. for ethylene. Temperatures ranging up to 150° C. and higher are generally satisfactory for Ziegler-type polymerization.

The pressure at which the polymerization is carried out is dependent upon the chosen monomer or monomers, as well as other variables. In most instances, the polymerization is suitably carried out at atmospheric pressure or higher. Subatmospheric pressures are permissible. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and, in some instances, on polymer quality. The choice of whether or not to use an appreciably elevated pressure will be one of economic and practical considerations taking into account the advantages that can be obtained thereby.

The following procedures are representative of the procedures which can be employed in preparing the modified catalysts of the present invention.

*Method A.*—Add 125 ml. of polymerization media to the reactor. Add 50 ml. media to $TiCl_4$ to be used. Allow $TiCl_4$ solution to run into the reactor. Rinse in with three 25-ml. portions of media. Add 50 ml. media to $AlR_3$ and allow to run into the reactor. Rinse in with three 25-ml. portions of media. If modifier is added, the requisite amount of modifier solution is added to 50 ml. of media, then washed into reactor with three 25-ml. portions of media. If no modifier is used, 125 ml. of media is added to the reactor after addition of the $AlR_3$. The catalyst is normally aged 10 minutes from time of completion of addition of $TiCl_4$ and $AlR_3$. Alcohols and other modifiers are not added until 15 minutes before start of polymerization.

*Method B.*—Concurrent streams of the $TiCl_4$ in 26/40 of the media and $AlR_3$ in 13/40 of the media are added to the reactor at 25° C. The rate of addition of the $TiCl_4$ stream is twice that of the $AlR_3$ stream. Addition is complete in 7 minutes. Heatup is started, bringing the mixture to 59° in the next 7 minutes. The requisite quantity of modifier as a 0.5 M solution, plus 1/40 of the media is then added (45 sec.). The polymerization is started at 15 minutes' time from the start of addition of the $TiCl_4$ and $AlR_3$ solution.

*Method C.*—To 30/40 of the polymerization media concurrent streams of $TiCl_4$ and $Al(i-Bu)_3$, each in 4.5/40 of the polymerization media are added over a 7-minute period. Heatup is started, bringing the catalyst suspension to 59° C. in the next 7 minutes. The modifier solution (requisite amount of 0.5 M solution+1/40 of media) is then added and the polymerization is started at 15 minutes' aging time, measured from start of addition of $TiCl_4$ and $AlR_3$ solution.

The catalyst is sensitive to various poisons, among which may be mentioned oxygen, water, carbon dioxide, carbon monoxide, acetylenic compounds such as acetylene, vinylacetylene, and the like. For this reason, suitable precautions should be taken to protect the catalyst and the reaction mixture from excessive contact with such materials. An excess of the aluminum compound tends to give a certain amount of protection against these poisons.

The monomers and diluents or solvents, if used, need not be pure so long as they are reasonably free from poisons. However best results are ordinarily obtained if the monomer feed contains at least 90 weight percent and preferably higher of the polymerizable monomer, exclusive of any solvent material. It is desirable to protect the catalyst during preparation, storage, and use by blanketing with an inert gas, e.g., nitrogen, argon, or helium.

The monomer or mixture of monomers is contacted with the catalyst in any convenient manner, preferably by bringing the catalyst and monomer together with intimate agitation provided by suitable stirring or other means. The agitation can be continued during the polymerization, or in some instances, the polymerization mixture can be allowed to remain quiescent while the polymerization takes place. In the case of the more rapid reactions with the more active catalyst, means can be provided for refluxing monomer and solvent if any of the latter is present, and thus remove the heat of reaction. In any event, adequate means should be provided for dissipating the exothermic heat of polymerization. If desired, the monomer can be brought in vapor phase into contact with the solid catalyst, in the presence or absence of liquid solvent. The polymerization can be effected in the batch manner, or in a continuous manner, such as, for example, by passing the reaction mixture through an elongated reaction tube which is contacted externally with suitable cooling medium to maintain desired reaction temperature; or by passing the reaction mixture through an equilibrium-overflow reactor, or a series of the same.

The polymer will be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture or the polymer after separation from solvent, etc., with methanolic hydrochloric acid, with an aliphatic alcohol such as methanol, isobutanol, secondary butanol, or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a nonsolvent, such nonsolvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

The foregoing principles and procedures can be applied, with suitable modifications when necessary, to reactions other than polymerizations, effected in the presence of Ziegler catalysts modified with a reactive organic oxygen compound in accordance with the present invention.

In one aspect, the present invention involves the beneficiation of Ziegler catalysts by the addition of proper amounts of alcohols. The alcohols are effective in modifying Ziegler catalyst so as to improve the melt index-impact properties of polymers prepared in the presence thereof. The alcohol modifiers, in general, differ in several respects from the phenol modifiers disclosed and claimed in our co-pending application, Serial No. 695,009. The alcohols tends to deactivate Ziegler catalysts more readily than do phenols when compared on a mole for mole basis, but yet are often needed in larger concentrations to obtain the desired improvement in polymer properties. Because of these differences, special procedures are often very useful in producing good results with alcohol modifiers. However, as discussed herein, the procedures described in our aforesaid copending application and the general procedures described herein can be employed when using alcohol modifiers. The concentrations of alcohols which can be employed are the same as those taught herein for reactive organic oxygen compounds in general, for example, about 0.1 to 2.5 or the like gram-moles of alcohol for each gram-atom of the reducible polyvalent metal in the catalyst.

The alcohol modifiers useful in the present invention include all aliphatic, alicyclic, aromatic, and heterocyclic alcohols; i.e., all carbinols. The aliphatic alcohols are very suitable, particularly the aliphatic hydrocarbon-ols such as the straight or branched chain alkanols of 1 to 20 carbon atoms, e.g., methanol, ethanol, n-propanol, isopropyl alcohol, pentanol, hexanol, octanol, n-decanol, etc.; or various unsaturated alcohols, e.g., stearyl alcohol, lauryl alcohol, olelyl alcohol, linoleyl alcohol, linolenyl alcohol, etc. Various other aliphatic alcohols can be used, e.g., such polyhdroxy alcohols as various glycols and glycerols, e.g., ethylene glycol, diethylene glycol, propylene glycol, glycerol, etc., but long-chain polyether surfactants are not contemplated as alcohols herein; and various sugars and sugar alcohols can be used, e.g., sorbose, fructose, glucose, sucrose, sorbital, etc. The alicyclic alcohols are, in general, equivalent to the aliphatic alcohols and such can be used with all the variations in structure, molecular weight, number of hydroxy groups, etc. contemplated for the aliphatic alcohols; for example, cyclohexanol, cyclopentanol, cyclohexyl carbinol, cyclohexyl ethanol, cyclohexanediol, etc., are applicable. The aromatic alcohols, as contemplated herein, include carbinols in which at least one substituent on the carbinol group contains an aromatic group; of course, the term is not intended to include the phenols, but is intended to cover aromatic compounds containing a non-aromatic hydroxyl group, i.e., a carbinol group. As aromatic groups, any of the aromatic groups described hereinbefore with respect to the phenols in our aforesaid copending application are satisfactory; examples of a few of the contemplated aromatic alcohols are benzyl alcohol, phenyl ethanol, p-methylbenzyl alcohol, dimethylbenzyl alcohol, etc. Various heterocylic alcohols can be employed as modifiers as long as they do not contain groups which produce undesired results; for example, pyridyl carbinol and furfuryl alcohol can be used.

In order to illustrate some of the various aspects and advantages of the invention, illustrative examples are given herein. Ethylene has been chosen as a representative monomer, triisobutyl-aluminum has been chosen as a representative reducing agent in preparing the catalyst, titanium tetrachloride has been chosen as a representative polyvalent metal compound that is reduced in preparing the catalyst, kerosene and isooctane, have been chosen as representative inert organic liquids for preparation of the catalyst dispersion and in which to carry out the polymerization. It will, of course, be understood that variations from the particular catalyst components, reactants, catalyst modifiers, solvents, proportions, temperatures and the like can be made without departing from the invention.

Example 1

Titanium tetrachloride in 700 ml. isooctane was added to a 2-liter jacketed glass reactor at 25° C. under vigorous stirring conditions. Al(i-butyl)$_3$ in 200 ml. isooctane was added at the rate of 25 ml. per minute. At the same time, the temperature of the jacket bath and polymerization medium was raised to reach about 45° C. at the end of the Al(i-butyl)$_3$ addition (8 minutes) and heating was continued until a temperature of 60° C. was reached (12 to 15 minutes from start of Al(i-butyl)$_3$ addition) at which point stearyl alcohol in 100 ml. isooctane was added to the mixture at a rapid rate (100 ml./30 seconds). As the stearyl alcohol was being added, the ethylene flow to the reactor was started at a rate sufficient to quickly saturate the isooctane; the ethylene flow rate was then adjusted to the desired rate. With a catalyst concentration (based on TiCl$_4$) of 20 mmoles per liter, and an aluminum to titanium ratio of 0.5, stearyl alcohol modifier in 1:1 or greater molar ratio to aluminum tended to inhibit polymerization. When the aluminum to titanium ratio employed was 0.6, however, the polymerization readily occurred with a stearyl alcohol to aluminum ratio of 1. To compensate for the tendency of the polymer molecular weight to increase at higher Al/Ti ratios, higher concentrations of catalyst can be used. The polyethylene product had the properties reported below:

TABLE I

| Run No. | Al/Ti Ratio | Mod./Al Ratio | Density | Specific Viscosity | Melt Index/Memory, percent | | Impact |
|---|---|---|---|---|---|---|---|
| A | 0.5 | 0.8 | 0.9504 | 0.178 | 0.69 | 40.2 | 1.4 |
| B | 0.6 | 1.0 | 0.9501 | 0.197 | 0.19 | 26.8 | 4.8 |

The impact strength of the polyethylene was determined by the Izod impact test which measures the energy necessary to break a notched specimen of the polymer when struck by a metal ball (ft.-lbs./inch of notch). The flow properties were determined (ASTM D–1238–52T) by forcing a molten polymer at a temperature of 90° C., through a small orifice and reported as the melt index, i.e., the extrusion rate in grams polymer per 10 minutes (decigrams/minute). The percent memory is a measure of the increase in diameter of the extruded polymer following its extrusion through the orifice; this value may also be termed recovery or percent of recovery. The specific viscosity of the polymer was determined on a solution of 0.1 weight percent polymer in xylene at 100° C.

The usual quenching and washing procedures were then utilized to obtain the polymer product. According to the usual procedure, ethylene flow was stopped, the reactor flushed with nitrogen, and the catalyst "quenched" by addition of anhydrous alcohol, e.g. isobutanol. The reaction mixture was then filtered to separate the suspended polyethylene from the liquid, the polyethylene was then worked up by heating in additional alcohol, e.g., isobutanol, filtered, washed with further amounts of the same alcohol and hexane and finally dried.

For both the catalyst preparation and the polymerization the usual procedures were employed to thoroughly clean and dry equipment and it was then maintained free of oxygen and moisture by flushing with lamp-grade nitrogen.

Example 2

Utilizing the apparatus of Example 1, stearyl alcohol dissolved in 200 ml. isooctane was added with vigorous stirring to a solution of TiCl$_4$ in 500 ml. isooctane. The temperature of the polymerization medium was raised to about 60° C. and ethylene was added at a sufficient rate to maintain a saturated solution at constant agitation (1100 revolutions per minute, turbine). Aluminum triisobutyl dissolved in 300 ml. of isooctane was added to the polymerization medium in about a two-minute period, and the ethylene saturation was maintained until a specified ethylene uptake was attained. The effect of the catalyst concentration on the induction period is set forth in Table II:

TABLE II

| No. | Al/Ti Ratio | Mod./Ti Ratio | Catalyst Conc. (mmoles/l of Ti) | Induction Period to 30 g./l./hr. Rate Level, min. |
|---|---|---|---|---|
| A | 0.5 | 0.75 | 20 | 76 |
| B | 0.5 | 0.75 | 40 | 33 |
| C | 0.5 | 0.75 | 50 | 19 |
| D | 0.5 | 0.75 | 60 | 10 |

It can be seen that under the specified conditions the induction period decreases with increasing catalyst concentrations. The effect of the catalyst concentration on polymer properties is set forth below.

TABLE III

| Run No. | Catalyst Conc. (mmoles/l.Ti) | Density | Specific Viscosity | Melt Index/ Memory, Percent | Impact |
|---|---|---|---|---|---|
| A | 20 | 0.945 | | | 16.0 |
| B | 40 | 0.950 | 0.249 | .07/21.9 | 15.8 |
| C | 50 | 0.956 | 0.228 | .17/29.3 | ¹8.6 |
| D | 60 | 0.956 | 0.197 | .31/30.4 | ¹4.7 |

¹ Incomplete break.

It can be seen that the stearyl alcohol modified catalyst produces polymer of improved impact-flow and other characteristics, particularly at the higher reported catalyst concentrations. The good impact-flow properties at the high-density level are particularly notable. The use of the modified technique of this example in which stearyl alcohol was mixed with titanium tetrachloride prior to the addition of aluminum alkyl, permitted the effective use of higher stearyl alcohol concentrations at Al/Ti ratios of 0.5 or below.

*Example 3*

In a 2-liter Morton flask a catalyst was prepared from aluminum triisobutyl and titanium tetrachloride in molar ratio of 0.50 in kerosene, the titanium tetrachloride being added to the aluminum triisobutyl. Isobutyl alcohol was added in concentration of 15 m.moles in the 1-liter charge which contained catalyst in concentration of 20 m.moles Ti/liter. The polymerization of ethylene was conducted at 70° C. at atmospheric pressure to give a polymer having a melt index of 2.9 decigrams/minute, an impact strength of 0.809 ft.-lbs./inch of notch, a specific viscosity (0.1% in xylene) of 0.11, and a density of 0.9490 gram/cc. The results demonstrate that use of isobutyl alcohol to modify Ziegler catalyst produces a polymer of improved impact-melt flow properties.

*Example 4*

Utilizing the procedure of Example 3, a catalyst was prepared and modified by addition of pine oil. The Al(isobutyl)$_3$/TiCl$_4$ mole ratio was 0.6, and the pine oil to aluminum mole ratio was 1.25. The catalyst in concentration of 21 m.moles Ti/liter of solvent at atmospheric pressure to polymerize ethylene to a high-density polyethylene of valuable properties. The melt index was 0.20 decigrams/minute and the Izod impact strength was 2.4 ft.-lbs. at a density of 0.947. The percent recovery was 39.

The pine oil utilized in the above example was a pine wood distillate consisting largely of terpineol and other monocyclic terpene alcohols.

The beneficial modifying effect of the alcohols may be due in part to the presence of active hydrogen in the compounds, for active hydrogen-containing compounds in general, such as acids, alcohols, etc., seem to have some modifying effect upon Ziegler catalysts and upon polymerizations utilizing the same. However, it is not required that the reactive organic oxygen compounds have active hydrogen in order to have a modifying effect.

Other organic oxygen compounds having active oxygen-containing functional groups suitable for use as modifiers for Ziegler catalysts are the organic carbonyl compounds, i.e., the organic ketones, aldehydes and acids (including acids in anhydride or ester form). All of these carbonyl compounds can be considered as alcohols in dehydrogenated or oxidized form. Any compounds containing a carbonyl group are applicable as modifiers; the term carbonyl is considered to include aromatic, aliphatic, alicyclic and heterocyclic carbonyl groups; the aliphatic carbonyl compounds can have either straight or forked chains. Examples of some of the applicable carbonyl compounds are acetone, cyclohexanone, methyl ethyl ketone, acetophenone, acetocyclohexane, quinone, coumaran-3-one, formaldehyde, acetaldehyde, propionaldehyde, benzaldehyde, cyclohexaldehyde, phenylacetaldehyde, furfural, formic acid, acetic acid, ethyl acetate, propionic acid, caproic acid, caprylic acid, lauric acid, stearic acid, oleic acid, castor oil, etc. In general, it can be said that any of the ketones, aldehydes, acids, or acid esters containing from about 1–3 to 20 or more carbon atoms are applicable as modifiers for Ziegler catalyst. Generally, it will be preferred that the non-carbonyl portion of the modifier compounds be saturated or unsaturated hydrocarbon, although functional groups which do not interfere with the modifier effect can be present. It is, of course, contemplated that one or more hydroxyl groups can be present in any of the carbonyl compounds which are used as modifiers. The esterifying groups in the acid esters used as modifiers can be any esterifying groups, although it will usually be convenient to employ such common alkyl and aryl groups as methyl, ethyl, isopropyl, phenyl, etc., or other such groups of 1 to 10 carbon atoms, to form such esters as, for example, methyl acetate, ethyl benzoate, etc.

The following examples are set forth utilizing several particular carbonyl compounds as representative of carbonyl compounds in general.

*Example 5*

In a 1-liter stainless steel autoclave, titanium tetrachloride dissolved in kerosene was added to aluminum triisobutyl dissolved in kerosene, and acetic acid was added to the mixture; the total charge was 500 ml. The Al/Ti ratio was 0.50, the concentration of Ti per liter was 20 m.moles, and the concentration of acetic acid was 15 m.moles per liter. Ethylene was admitted at 100 p.s.i. and polymerization was effected at 70° C. to give a high-density polymer (0.9550 gram/cc.) having a high melt index (12.9). The tensile strength of the polymer was good, being 3937 p.s.i. to the breaking point.

*Example 6*

A 2-liter Morton flask was charged with Deobase kerosene, titanium tetrachloride and aluminum triisobutyl, the aluminum triisobutyl being added after the titanium tetrachloride. The catalyst was permitted to age at 25–70° C. for 15 minutes, trichloroacetic acid in 100 ml. kerosene being added at age 12 minutes. The amounts of the various components were 20 m.moles Ti, 10 m.moles Al, 10 m.moles trichloroacetic acid, and 1000 ml. kerosene. Polymerization of ethylene was effected at 70° C. and atmospheric pressure to give a polymer having a density of 0.9486 gram/cc., a melt index of 4.3, and having a tensile breaking strength of 3950 p.s.i. A polymer produced in a run under the same conditions but without the trichloroacetic acid as modifier had a density of 0.9417, a melt index of 0.27, and a tensile breaking strength of 1980 p.s.i.

While the above examples teach representative conditions which are effective when employing organic carbonyl compounds as modifiers for Ziegler catalysts, it will be realized that the conditions should be varied to some extent in accordance with the general principles taught herein in order to obtain optimum results with particular carbonyl modifiers. In particular, the ratio of metal alkyl to polyvalent metal, the concentration of the catalyst, the concentration of the modifier, the aging of the catalyst, the temperature and pressure of the polymerization, etc., can be varied in order to vary the results in the manner taught hereinabove.

In another aspect, the present invention involves the use of organic peroxides as modifiers for Ziegler catalysts for use in polymerizing ethylene and other monomers as disclosed herein. The peroxides are oxidizing agents and have an effect on the oxidation-reduction reactions of the Ziegler catalyst components. The peroxide group can be present in any of the hydrocarbon or other structures disclosed herein with respect to alcohol and carbonyl compound modifiers; for example, such compounds as benzoyl peroxide, ethyl hydrogen peroxide, etc., are applicable as Ziegler catalyst modifiers. It will be appreciated that the rather unstable nature of the peroxides will make them less desirable as modifiers in many respects than the other modifiers disclosed herein. In addition, the peroxides will be less effective in improving the impact-flow relationship than the alcohols under the conditions disclosed herein.

In one particular aspect, the present invention concerns the proper timing of the addition of the modifier to the catalyst to obtain the optimum impact-flow improvement. The modifier will not ordinarily be added more than 10 to 15 minutes prior to start of the polymerization, and very good results are obtained when the modified catalyst is prepared just prior to the start of polymerization.

It has recently been discovered that the molecular weight distribution has a marked effect on properties of Ziegler polymers. If a normal Ziegler polyethylene is fractionated into various fractions according to molecular weight, i.e., low, medium, high, etc., it is found that some of the intermediate fractions having narrow molecular weight distributions possess good impact/flow properties. Such polymers have a medium molecular weight, $M_n$, which approaches their average molecular weight, $M_w$, i.e., there are not a sufficient number of extremely high molecular weight species present to make the weight average molecular weight, $M_w$, (which gives weighted value to higher molecular weights) much higher than the number average molecular weight, $M_n$ (which is not unduly influenced by higher molecular weights). It follows from the above that it is desirable to have a low $M_w/M_n$ ratio, approaching 1. Extensive fractionation of the polymers according to molecular weight would not ordinarily be economically feasible. However, the present invention makes such fractionation unnecessary as the polymers herein have a narrow molecular weight range. This provides an alternate method of defining the polymers produced by the processes of the present invention; the reactive oxygen compound modifiers utilized in the present invention make it possible to obtain $M_w/M_n$ values less than 5, and often in the range of 3 to 2 or less.

The $M_w$ and $M_n$ utilized herein can be determined by calculation from distribution curves based upon viscosity measurements for the various polymer fractions; the method has been described in "Fractionation of Polyethylenes," by P. S. Francis, R. C. Cooke, Jr., and J. H. Elliott (presented at the American Chemical Society spring meeting in Atlantic City, 1956).

It is not seen to be necessary to define the particular mechanism by which the reactive oxygen compound affects the catalyst and produces valuable results, and we not wish to be bound by any theory concerning the same. However, the following theory is of interest as improving understanding of the invention. It appears that reactive oxygen compounds act to minimize the reduction of $Ti^{+4}$ to $Ti^{+3}$ that normally occurs after polymerization is started; this apparently reduces the number of polymerization initiation sites available for polymerization resulting in a higher $M_n$. A second action is apparently selective as to type of site since the amount of extremely high molecular weight species (associated with highly reduced Ti catalyst) is diminished as is evidenced by a reduction in $M_w$ values and the lack of gel. Thus, in certain broader aspects, the present invention concerns use of a modifier or poison for the purpose of minimizing the reduction of $Ti^{+4}$ to $Ti^{+3}$, $Ti^{+2}$, etc., with a view toward selectively reducing the number of initiation sites. For example, a few minutes after $Al(isobutyl)_3/TiCl_4$ catalyst has been prepared, the reduced titanium content, i.e., $TiCl_3$ may be about 30%, and this value may slowly rise during an ethylene polymerization to over 50% in two hours (in the absence of ethylene, it may rise to about 60% in the same period); however, when a suitable amount of reactive oxygen compound is added as modifier, the per cent of reduced titanium tends to be stabilized against increase.

As is implicit in the above discussion, it is believed that the present invention provides an effective means of controlling the concentration and type of catalyst, thereby providing a means of controlling the course of the catalyzed polymerizations.

In some respects, it appears that the impact/flow properties of Ziegler polyethylene are improved when the polymerization is conducted under moderate pressures above atmospheric pressure. It is ordinarily difficult to conduct a Ziegler polymerization under pressure because the rapid, exothermic reaction is difficult to control. In one aspect, the present invention can be considered as involving means of controlling or moderating the Ziegler polymerization under pressure and avoiding excessive heat build-up. The use of pressure will usually increase the density of the resulting polyethylene.

The improved molecular weight distribution of the polymers prepared by the process of the present invention causes improved transparency of the polymers. This makes it feasible to blow the polymers into films which are suitable as transparent wrapping materials and the like.

In addition to the procedures taught herein, reactive organic oxygen compounds can be used according to any of the procedures taught in the copending application of Harry M. Andersen, Serial Number 609,798, filed September 14, 1956, now Patent No. 3,009,908.

While the invention has been described with particular reference to preferred embodiments thereof, it will be appreciated that variations from the details given herein can be effected without departing from the invention in its broadest aspects.

What is claimed is:

The method of preparing a modified catalyst which comprises mixing triisobutyl aluminum with titanium tetrachloride and then adding isobutanol as modifier, the proportions being from 0.3 to 0.8 moles triisobutyl aluminum and 0.1 to 1.5 moles isobutanol per mole of titanium tetrachloride.

References Cited in the file of this patent
UNITED STATES PATENTS

| | | |
|---|---|---|
| 2,085,535 | Langedijk et al. | June 29, 1937 |
| 2,153,553 | Fawcett et al. | Apr. 11, 1939 |
| 2,395,381 | Squires | Feb. 19, 1946 |
| 2,440,800 | Hanford et al. | May 4, 1948 |
| 2,449,489 | Larson | Sept. 14, 1948 |
| 2,457,229 | Hanford et al. | Dec. 28, 1948 |
| 2,692,259 | Peters | Oct. 19, 1954 |
| 2,721,189 | Anderson et al. | Oct. 18, 1955 |

(Other references on following page)